(12) United States Patent
Homer et al.

(10) Patent No.: US 7,145,766 B2
(45) Date of Patent: Dec. 5, 2006

(54) DISPLAY FOR AN ELECTRONIC DEVICE

(75) Inventors: Steven S. Homer, Tomball, TX (US);
Paul J. Doczy, Cypress, TX (US);
Mark C. Solomon, Cypress, TX (US);
Stacy Wolff, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

(21) Appl. No.: 10/687,187

(22) Filed: Oct. 16, 2003

(65) Prior Publication Data

US 2005/0083308 A1    Apr. 21, 2005

(51) Int. Cl.
*G01F 1/16* (2006.01)
(52) U.S. Cl. .................. 361/681; 361/684; 349/58; 345/173
(58) Field of Classification Search ............... 361/681, 361/682, 683, 686, 731, 725, 679, 730, 759, 361/780; 312/223.2, 223.3; 248/589, 602, 248/612, 615, 616, 618, 632–634, 917, 918; 345/173, 176, 179, 182, 183, 102, 104, 168, 345/169, 905; D14/341–346
See application file for complete search history.

(56) References Cited

U.S. PATENT DOCUMENTS

| | | | |
|---|---|---|---|
| 5,067,573 A * | 11/1991 | Uchida ....................... 345/173 |
| 5,442,470 A * | 8/1995 | Hashimoto ..................... 349/58 |
| 5,452,950 A | 9/1995 | Crenshaw et al. |
| 5,467,102 A * | 11/1995 | Kuno et al. .................... 345/1.3 |
| 5,574,625 A * | 11/1996 | Ohgami et al. ............. 361/684 |
| 5,583,681 A * | 12/1996 | Shioya et al. ................ 349/60 |
| 5,659,376 A * | 8/1997 | Uehara et al. ................ 349/58 |
| 5,847,698 A * | 12/1998 | Reavey et al. ............. 345/173 |
| 5,900,848 A * | 5/1999 | Haneda et al. ............. 345/1.1 |
| 6,174,482 B1 * | 1/2001 | Reames et al. ............. 264/250 |
| 6,215,476 B1 * | 4/2001 | Depew et al. .............. 345/173 |
| 6,286,440 B1 | 9/2001 | Jyringi |
| D460,448 S * | 7/2002 | Matsumoto ................ D14/346 |
| 6,532,152 B1 * | 3/2003 | White et al. ................ 361/692 |
| D479,235 S * | 9/2003 | Tanaka et al. ............. D14/346 |
| 6,781,819 B1 * | 8/2004 | Yang et al. ................. 361/680 |
| 2004/0027392 A1 * | 2/2004 | Dunn et al. ................. 345/810 |

FOREIGN PATENT DOCUMENTS

DE    20113314 U1 *    1/2002

OTHER PUBLICATIONS www.webopedia.com/TERM/Graphical User Interface_GUI.html (pp. 1-2).*
www.google.com/search . . . + graphical +user+interface (pp. 1-3).*

* cited by examiner

*Primary Examiner*—Michael Datskovskiy

(57) ABSTRACT

An electronic device is formed with a housing having a perimeter edge. A controller is located within the housing. Additionally, a display surface extends in a smooth manner outwardly to the perimeter edge.

34 Claims, 6 Drawing Sheets

DISPLAY FOR AN ELECTRONIC DEVICE

BACKGROUND OF THE INVENTION

A variety of displays are utilized with electronic devices, such a portable computers, to display information to an individual using the device. A graphical user interface "GUI" allows the individual to interact with the device through an input device, such as a keyboard or mouse. Other displays allow the individual to interact with the display itself through the use of touch screens, including screens designed to permit written instructions via a pointer. However, such screens are susceptible to scratching and other wear that limits the useful life of the display. Additionally, such devices utilize a housing in which the display screen is mounted. The housing tends to inhibit movement of the individual's hand across the screen. The interfering housing can limit the ability of the individual to comfortably interact with the display by, for example, writing instructions or other inputs onto the screen.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

Figure 1:
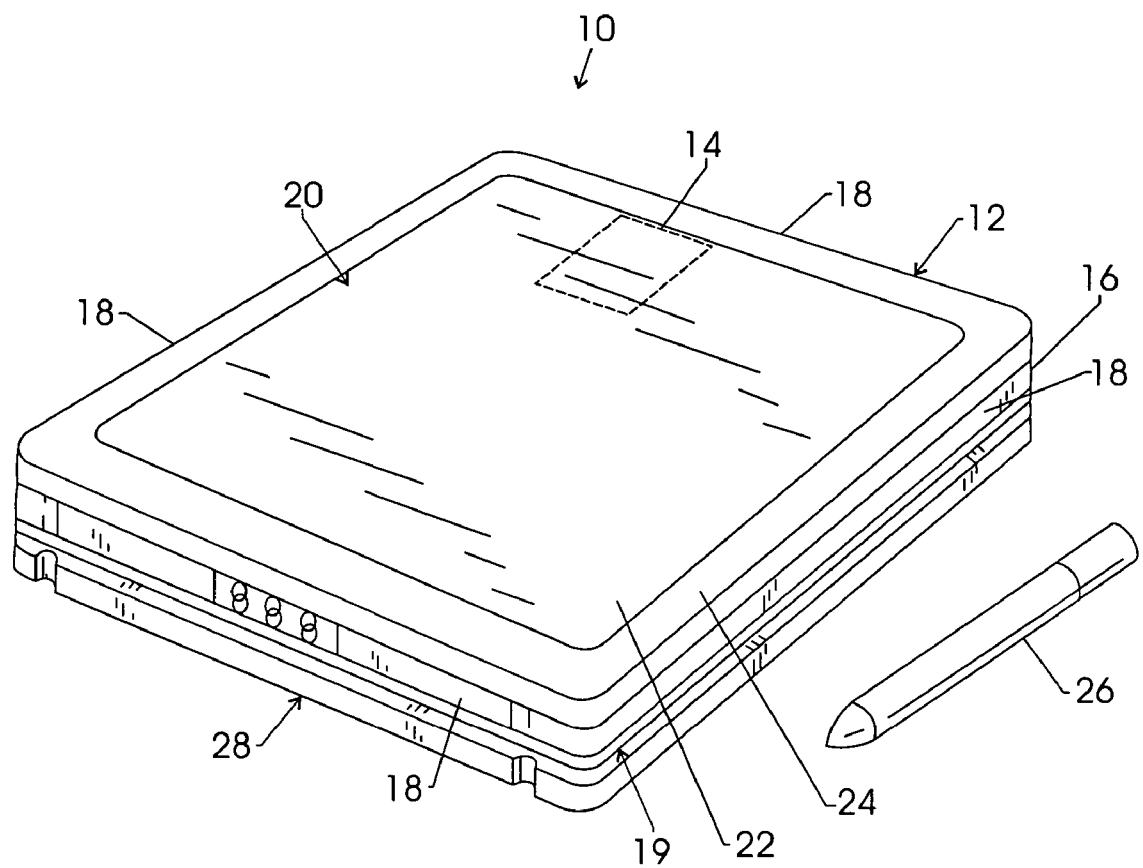
FIG. 1 is a perspective view of an electronic device, according to an embodiment of the present invention.

Referring generally to FIG. 1, an electronic device 10 is illustrated according to an embodiment of the present invention. The electronic device 10 may be a computer-based device, such as a portable computer.

In one embodiment, the electronic device 10 comprises a personal computer 12 having an internal controller 14, such as a microprocessor. A housing 16 encloses the controller 14 electrically coupled to a display for displaying information and/or interacting with a user. The housing 16 has a perimeter edge 18 and a base surface 19. A display surface 20 extends outwardly to the perimeter edge 18. The base surface 19 is generally opposite the display surface 20 and may be parallel with the display surface 20. In the embodiment illustrated, the perimeter edge 18 defines a generally rectangular shape, and the display surface 20 is generally rectangular. However, the perimeter edge 18 and the display surface 20 may have forms in other shapes. As illustrated, the display surface 20 extends uninterrupted from one perimeter edge 18 to another. For example, the display surface 20 may be disposed along a plane extending through the perimeter edge 18. A top surface of the display surface 20 abuts the perimeter edge 18 to form an uninterrupted, smooth transition between the display surface 20 and the perimeter edge 18, so that no bumps, ridges, indentions, or the like exist along the junction below the display surface 20 and the perimeter edge 18.

In one embodiment, the display surface 20 is defined by a display panel, such as a glass panel 22 located within a surrounding bezel 24. The glass panel 22 is positioned flush with the top of the bezel 24 to provide a smooth transition from the glass panel 22 to the bezel 24. In other words, an individual interacting with the electronic device 10 via the display surface 20 is able to write or draw against the glass panel 22 without encountering any obstruction as the individual moves a hand or instrument across the glass panel 22 and the bezel 24. The use of glass protects against scratching and other types of wear when a pen or other pointer mechanism, e.g. a pointer mechanism 26, is used on the display surface 20. It should be noted that the electronic device 10 may utilize other input devices, such as a detachable keyboard 28.

Figure 2:
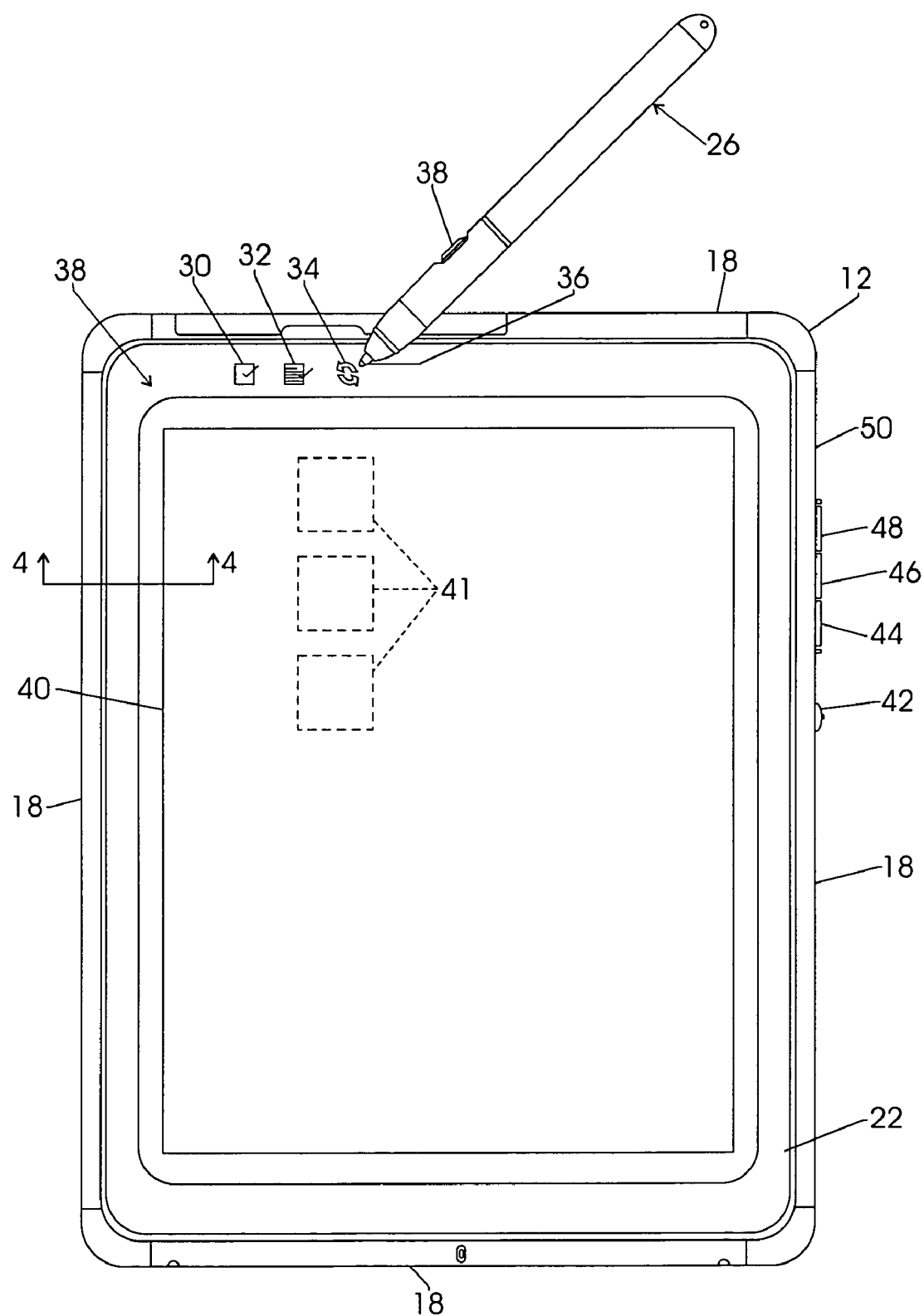
FIG. 2 is a top view of the electronic device of FIG. 1.

With additional reference to FIG. 2, one example of the personal computer 12 is a portable computer, such as a tablet personal computer (PC). The tablet PC has a portable, easy-to-grasp form factor with an integral display and internal controller.

The pointer mechanism 26, by way of example, may be in the form of a battery powered digitizer pin. In this embodiment, the pointer mechanism 26 is designed to interact with various digitizer activated buttons 30, 32 and 34. As illustrated, the pointer mechanism 26 comprises a tip 36 and one or more buttons, such as a select button 38, to facilitate user interaction with the digitizer-activated buttons 30, 32 and 34.

The pointer mechanism 26 may be designed to interact with a digitizer panel 40 disposed below the display surface 20 within the housing 16 (see also FIG. 4). The digitizer panel 40 may be disposed below the glass panel 22 with, for example, a small gap between the digitizer panel 40 and the glass panel 22.

In the embodiment illustrated, the pointer mechanism 26 interacts with the digitizer panel 40 and an associated graphical user interface (GUI) 41 for coordination, selection, writing and other user-interaction via information provided through the display surface 20. The pointer mechanism 26 also may be utilized with a variety of buttons/icons 30, 32 and 34 to perform various predetermined functions. Furthermore, the digitizer panel 40 and the pointer mechanism 26 may comprise a variety of suitable technologies for interaction, such as electron field, ultrasonic, radio frequency, infrared, electrostatic, electromagnetic and other existing, emerging or future technologies. The digitizer panel 40 and the pointer mechanism 26 may operate by one-way or two-way signal transmissions, in either direction, between the digitizer panel 40 and the pointer mechanism 16.

Depending on the type and application of the electronic device 10, a variety of other input mechanisms may be utilized. For example, a plurality of physical buttons 42, 44, 46, 48 and 50 may be mounted along housing 16. As illustrated in FIG. 2, the buttons may be located at a desired position along the perimeter edge 18. Examples of functional buttons comprise a jog dial, an SEC key, a tab key, a CRL-ALT-DEL key combination, a RETURN key, a mouse key or other standard or specialized keys. These are just a few examples of the types of functionality and the physical form factors available for the electronic device 10.

Figure 3:
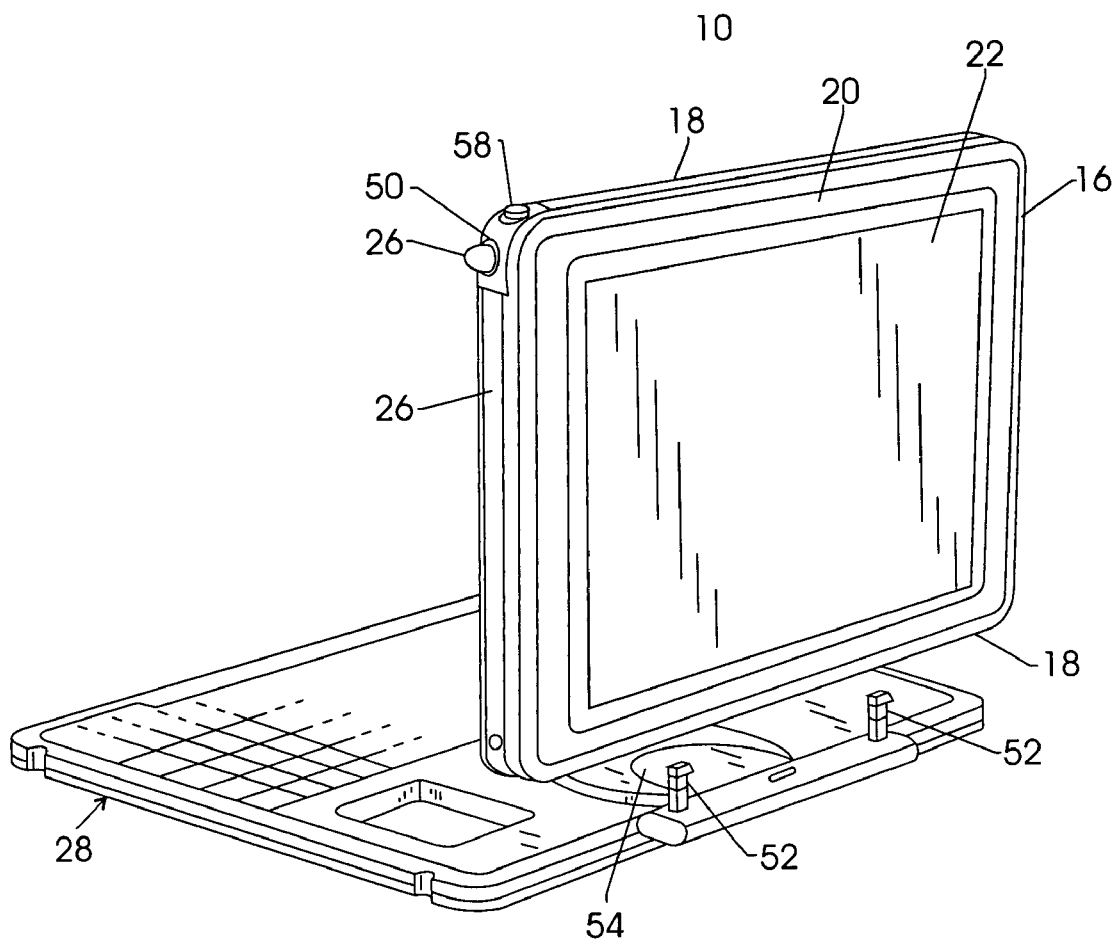
FIG. 3 is a perspective view of the device illustrated in FIG. 1 detached from an embodiment of a keyboard.

Referring also to FIG. 3, the input mechanisms may comprise a detachable keyboard 28. In this embodiment, the detachable keyboard 28 comprises one or more attachment prongs 52 that are slidably received through the perimeter edge 18. The attachment prongs 52 are mounted to a pivot 54 that permits the pivoting of the housing 16 and the display surface 20 with respect to the detachable keyboard 28. In this manner, the display surface 20 may be positioned at a variety of orientations with respect to the detachable keyboard 28 including a fully folded position, as illustrated in FIG. 1, in which the display surface 20 remains available for viewing and interaction.

With further reference to FIG. 3, the housing 16 may be designed to accommodate other features, such as a storage recess 56 for receiving the pointer mechanism 26. Additionally, a power button 58 may be mounted along the perimeter edge 18. Each of these features has been described to provide examples of various functions and features that can be incorporated into the electronic device 10, and should not be construed as limiting.

Figure 4:
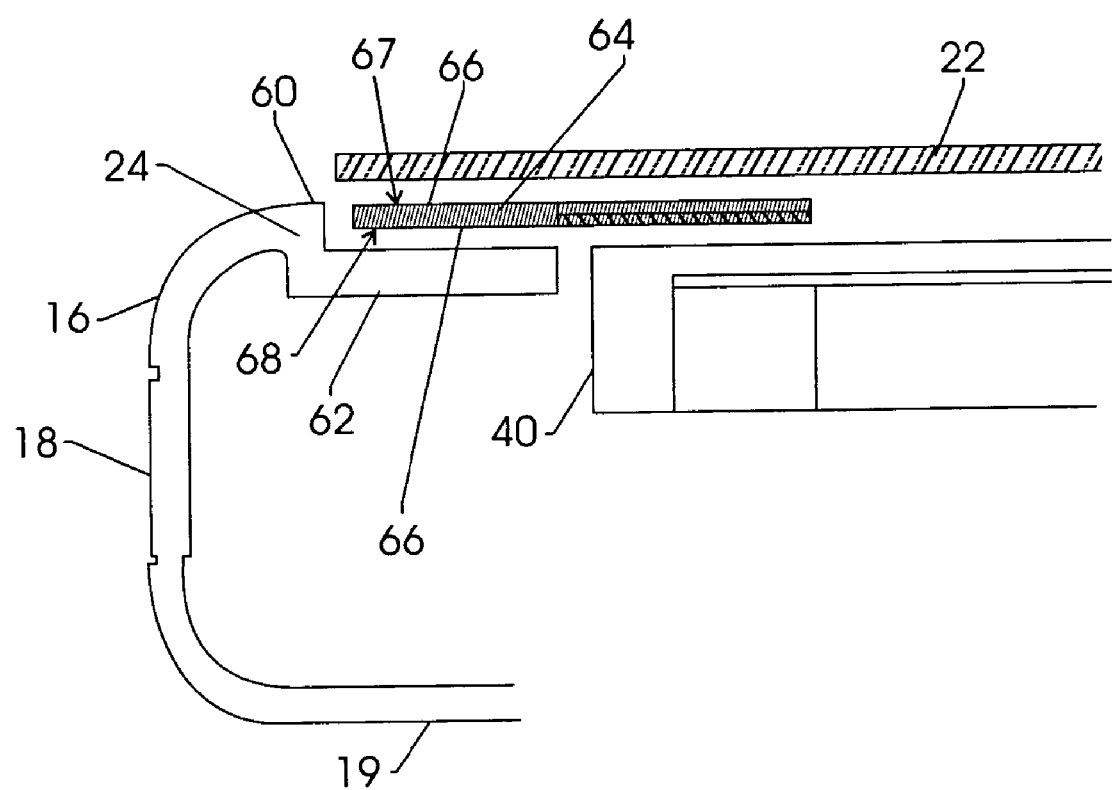
FIG. 4 is an exploded cross-sectional view taken generally along line 4—4 of FIG. 1.

Referring generally to FIG. 4, the glass panel 22 is mounted to the bezel 24. The bezel 24 may comprise an external section 60 and an underlying support section 62. The bezel external section 60 is sized to enable a flush mounting with the glass panel 22, and an underlying support section 62 is disposed to support the glass panel 22 along its perimeter. As illustrated, a pad 64 (see also FIGS. 5 and 6) is disposed between the glass panel 22 and the underlying support section 62. The dimensions of the external sections 60 and the pad 64 are selected such that when the glass panel 22 is mounted on the underlying support section 62, the outer surface of the glass panel 22 is flush with the external surface of the bezel external section 60. In other words, a smooth display surface 20, free of ridges or other interfering obstacles, is enabled by the smooth transition between the glass panel 22 and the external section 60.

Figure 5:
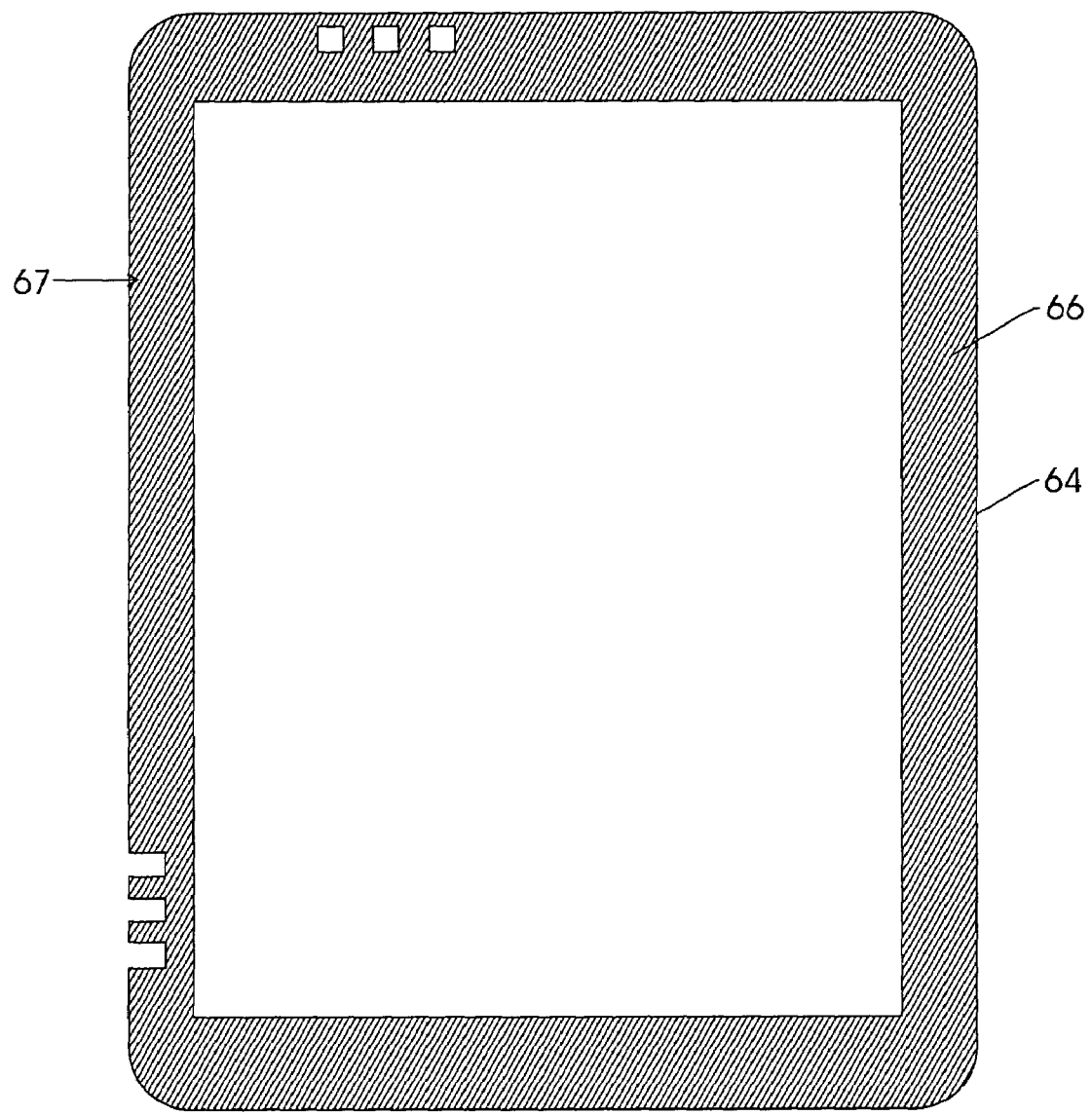
FIG. 5 is a top view of an embodiment of a pad utilized in the display illustrated in FIG. 1.
Figure 6:
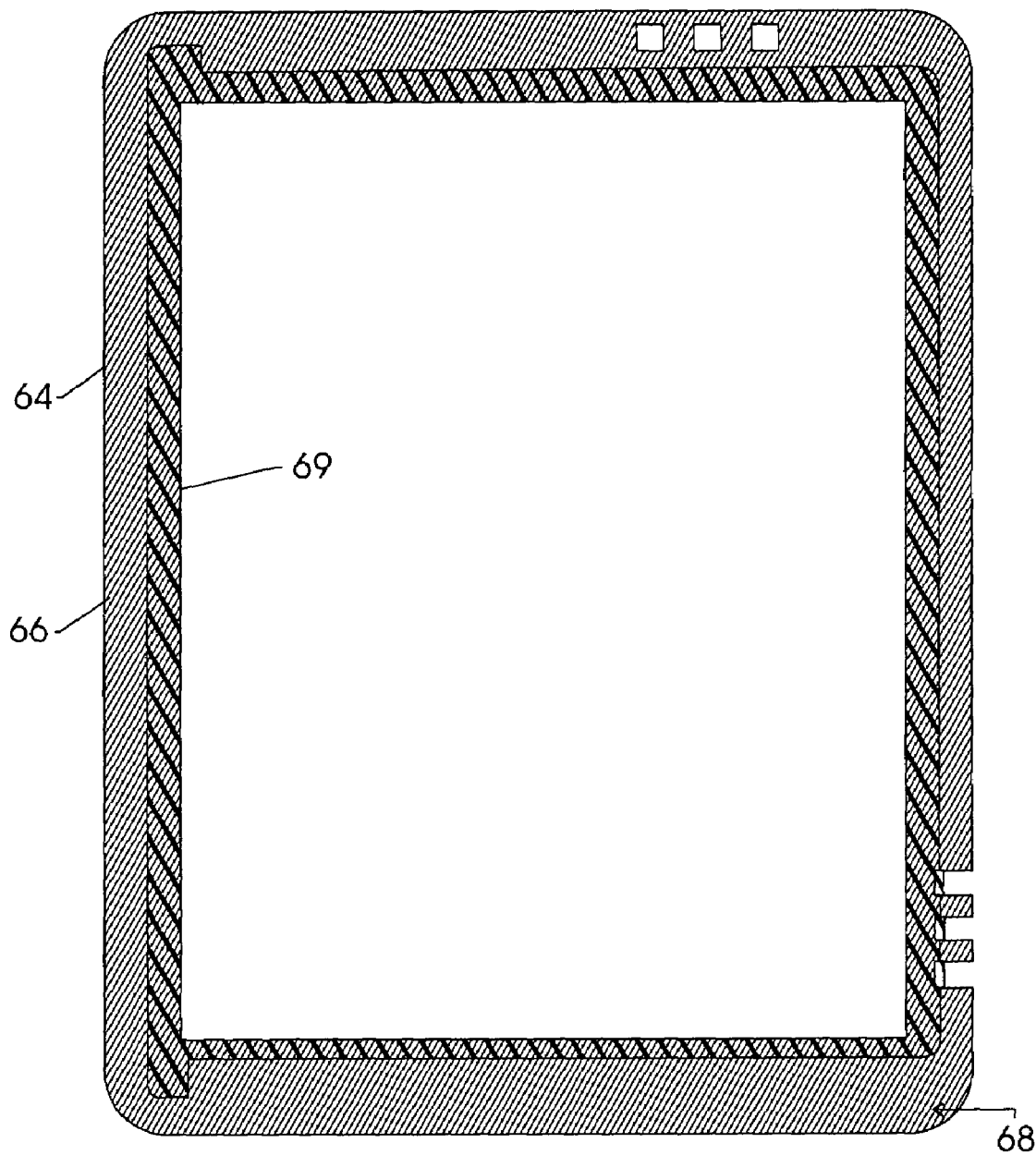
FIG. 6 is a bottom view of the pad illustrated in FIG. 6.

The glass panel 22 may be attached to the bezel 24 by a variety of mechanisms, including fasteners and adhesives. In one embodiment, however, the glass panel 22 is attached to the underlying support section 62 by an adhesive 66 applied to the pad 64. For example, the adhesive 66 may be applied between the glass panel 22 and a top surface 67 of the pad 64, as illustrated in FIG. 5. Additionally, the adhesive 66 may be applied between the underlying support section 62 and a bottom surface 68 of the pad 64, as illustrated in FIG. 6. When the glass panel 22, the pad 64, and the underlying support section 62 are pressed together, the adhesive 66 securely holds the glass panel 22 in place with respect to the housing 16. The positioning of the pad 64 also helps absorb shock and vibration in the event the device 10 is dropped or otherwise jarred.

Depending on the specific design of the housing 16, the panel 22, and the digitizer panel 40, the adhesive 66 is not necessarily applied along the entire top and/or bottom surface of the pad 64. For example, a region 69 along the bottom surface of the pad 64 may remain free from adhesive. The region 68 serves as a seal between the digitizer panel 40 and the glass panel 22 to prevent dust or other debris from moving between the panel 22 and the digitizer panel 40. Also, the pad 64 potentially may be formed from a variety of materials, but one embodiment of the pad 64 utilizes a sheet of foam material.

While the invention may be susceptible to various modifications and alternative forms, specific embodiments have been shown by way of example in the drawings and described in detail herein. However, it should be understood that the invention is not intended to be limited to the particular forms disclosed.

What is claimed is:

1. A personal computer, comprising:
a housing having a support section;
a display having an inner display panel and an outer panel; and
a resilient pad disposed between and adjacent the outer panel and both the support section and the inner display panel.

2. The personal computer as set recited in claim 1, wherein the outer panel is formed by a glass panel.

3. The personal computer as recited in claim 1, wherein the housing comprises a base wall disposed generally parallel to the outer panel.

4. The personal computer as recited in claim 1, wherein the housing has a perimeter edge that is arranged in a rectangle.

5. The personal computer as recited in claim 1, wherein the inner display panel comprises a digitizer panel.

6. The personal computer as recited in claim 5, comprising a pointer adapted to actuate the digitizer panel.

7. The personal computer as recited in claim 1, comprising a keyboard removeably attachable to the housing.

8. The personal computer as recited in claim 1, wherein a face of the resilient pad comprises an adhesive region adjacent the support section and a non-adhesive region adjacent the inner display panel.

9. The personal computer as recited in claim 1, wherein the personal computer comprises a tablet personal computer.

10. The personal computer as recited in claim 1, wherein the resilient pad is configured to absorb shock.

11. The personal computer as recited in claim 1, wherein the resilient pad is adhesively coupled to the outer panel and the housing but not the inner display panel.

12. The personal computer as recited in claim 1, wherein the outer panel comprises a substantially transparent protective cover that overhangs a substantial portion of the inner display panel.

13. The personal computer as recited in claim 1, wherein a top surface of the outer panel and a surrounding top surface of the housing define a single substantially planar top surface with a smooth interface between the outer panel and the housing.

14. An electronic device, comprising:
a tablet style personal computer comprising:
a housing with a bezel;
a protective panel coupled to the bezel; and
a shock absorbent pad disposed underneath the protective panel, wherein the shock absorbent pad comprises a double-sided adhesive region and a single-sided adhesive region.

15. The electronic device as recited in claim 14, comprising a controller disposed within the housing.

16. The electronic device as recited in claim 14, wherein the protective panel is recessed into the bezel of the housing such that the protective panel is flush with an outer surface of the bezel.

17. The electronic device as recited in claim 16, wherein the protective panel abuts the bezel to form a top surface with a smooth and uninterrupted junction where the protective panel and the bezel abut.

18. The electronic device as recited in claim 14, wherein the tablet style personal computer comprises a digitizer panel disposed adjacent the single-sided adhesive region of the shock absorbent pad, and wherein the double-sided adhesive region of the shock absorbent pad is adjacent the bezel.

19. The electronic device as recited in claim 14, wherein the tablet style personal computer comprises an electronic display panel with a perimeter, and the protective panel extends beyond at least most of the perimeter of the electronic display panel.

20. The electronic device as recited in claim 14, comprising a digitizer panel disposed behind the protective panel.

21. A method of manufacturing a computer, comprising the acts of:

providing a portable computer housing in a tablet style form factor;

applying a shock absorbing pad to the portable computer housing; and mounting a display panel to the portable computer housing, wherein the shock absorbing pad is disposed between the display panel and the portable computer housing, wherein the shock absorbing pad comprises a double-sided adhesive between the portable computer housing and a protective top panel of the display panel, and the shock absorbing pad comprises a non-adhesive portion disposed against an electronic display panel of the display panel.

22. The method as recited in claim 21, wherein the act of mounting comprises the act of mounting the protective top panel made of glass.

23. The method as recited in claim 21, comprising the act of disposing a microprocessor within the portable computer housing.

24. The method as recited in claim 23, comprising the act of disposing the electronic display panel beneath the protective top panel of the display panel.

25. The method as recited in claim 21, comprising the act of positioning the protective top panel to form a display surface that is substantially co-planar with a top portion of the portable computer housing.

26. The method as recited in claim 21, wherein substantially all of the portion of the shock absorbing pad disposed against the electronic display panel is non-adhesive.

27. The method as recited in claim 21, wherein the act of mounting comprises fitting an outer perimeter of the protective top panel substantially flush and uninterrupted with an inner perimeter of a display receptacle in the portable computer housing.

28. The method as recited in claim 21, wherein mounting comprises securing the display panel to the portable computer housing in a manner providing a smooth transition between the display panel and the portable computer housing.

29. A computer system, comprising a housing;

a display having a protective outer surface; and a shock absorbing pad disposed between the protective outer surface of the display and the housing, wherein the shock absorbent pad comprises a face with an adhesive region and a non-adhesive region.

30. The computer system as recited in claim 29, wherein the display comprises a digitizer panel.

31. The computer system as recited in claim 29, wherein a transition between a perimeter of the protective outer surface and an edge of the housing extending around the perimeter of the protective outer surface is uninterrupted around at least most of the perimeter of the protective outer surface.

32. The computer system as recited in claim 29, wherein the shock absorbing pad is disposed against a bottom surface of a protective outer panel having the protective outer surface opposite from the bottom surface.

33. The computer system as recited in claim 29, wherein:

the housing comprises a top face and perimeter edge;

the shock absorbing pad spaces the protective outer surface of the display away from the housing and in general flush alignment with the top face of the housing; and the top display surface is sized to directly abut the perimeter edge.

34. The computer system as recited in claim 29, wherein another face of the shock absorbing pad is adhesively coupled to protective outer surface.

* * * * *

UNITED STATES PATENT AND TRADEMARK OFFICE
CERTIFICATE OF CORRECTION

| | | |
|---|---|---|
| PATENT NO. | : 7,145,766 B2 | Page 1 of 1 |
| APPLICATION NO. | : 10/687187 | |
| DATED | : December 5, 2006 | |
| INVENTOR(S) | : Steven S. Homer et al. | |

It is certified that error appears in the above-identified patent and that said Letters Patent is hereby corrected as shown below:

In column 4, line 1, in Claim 2, after "as" delete "set".

In column 6, line 4, in Claim 29, after "comprising" insert -- : --.

Signed and Sealed this

Twenty-seventh Day of January, 2009

JOHN DOLL
*Acting Director of the United States Patent and Trademark Office*